US009896992B2

(12) United States Patent
Smiljanovski et al.

(10) Patent No.: US 9,896,992 B2
(45) Date of Patent: Feb. 20, 2018

(54) PRESSURE-CHARGED COMBUSTION ENGINE HAVING A DOUBLE-FLOW TURBINE AND GROUPED CYLINDERS

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Franz Arnd Sommerhoff, Aachen (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/072,093

(22) Filed: Mar. 16, 2016

(65) Prior Publication Data
US 2016/0290219 A1 Oct. 6, 2016

(30) Foreign Application Priority Data

Apr. 2, 2015 (DE) ........................ 10 2015 205 998

(51) Int. Cl.
*F02D 23/00* (2006.01)
*F01N 1/00* (2006.01)
(Continued)

(52) U.S. Cl.
CPC ............ *F02B 37/025* (2013.01); *F01D 5/141* (2013.01); *F01D 9/026* (2013.01); *F01N 13/10* (2013.01);
(Continued)

(58) Field of Classification Search
CPC ........ F02B 37/025; F02B 27/04; F02B 75/18; F01D 5/141; F01D 25/24; F01D 9/026;
(Continued)

(56) References Cited

U.S. PATENT DOCUMENTS 2,800,297 A * 7/1957 Ergenc ...................... F01D 1/08
415/152.2
3,383,092 A * 5/1968 Cazier ................... F02B 37/025
415/205
(Continued)

FOREIGN PATENT DOCUMENTS

DE 102013216608 A1 2/2015
FR 2910536 A1 * 6/2008 ............. F01N 13/10
(Continued)

*Primary Examiner* — Thai Ba Trieu
(74) *Attorney, Agent, or Firm* — Julia Voutyras; McCoy Russell LLP

(57) ABSTRACT

Methods and systems are provided for a pressure-charged combustion engine having at least one cylinder head comprising at least two cylinders. In one example, a system may include each cylinder having at least one outlet port, at least two cylinders configured to form two groups each comprising at least one cylinder, exhaust lines joined together to form an overall exhaust line which provides an exhaust manifold, the exhaust lines connected to an exhaust turbocharger and equipped with rotor blades wherein each rotor blade comprises a first inlet edge facing the flows and a second inlet edge facing the flows connected to one another at a connection point forming an inflection.

13 Claims, 5 Drawing Sheets

(51) Int. Cl.

| | |
|---|---|
| *F04D 29/44* | (2006.01) |
| *F04D 29/54* | (2006.01) |
| *F02D 13/06* | (2006.01) |
| *F02B 37/02* | (2006.01) |
| *F01N 13/10* | (2010.01) |
| *F01D 5/14* | (2006.01) |
| *F02B 27/04* | (2006.01) |
| *F01D 9/02* | (2006.01) |
| *F02B 75/18* | (2006.01) |

(52) U.S. Cl.
    CPC ............. *F02B 27/04* (2013.01); *F02B 75/18* (2013.01); *F05D 2220/40* (2013.01); *F05D 2240/303* (2013.01); *F05D 2250/181* (2013.01); *Y02T 10/144* (2013.01); *Y02T 10/146* (2013.01)

(58) Field of Classification Search
    CPC ...... F01N 13/10; Y02T 10/144; Y02T 10/146; F05D 2220/40; F05D 2240/303; F05D 2250/181
    USPC ............... 415/204–206; 416/223 A; 60/602, 60/323 D, 323
    See application file for complete search history.

(56) References Cited

U.S. PATENT DOCUMENTS

| | | | | |
|---|---|---|---|---|
| 3,614,259 | A * | 10/1971 | Neff | F02B 37/025 415/205 |
| 3,877,230 | A * | 4/1975 | Overy | F02B 37/025 60/606 |
| 4,111,598 | A * | 9/1978 | Kasuya | F02B 37/025 415/205 |
| 4,179,892 | A * | 12/1979 | Heydrich | F02B 37/025 60/605.2 |
| 5,094,587 | A * | 3/1992 | Woollenweber | F02B 37/025 415/205 |
| 6,324,847 | B1 * | 12/2001 | Pierpont | F02B 37/02 60/602 |
| 6,786,190 | B2 * | 9/2004 | Wu | F02D 17/02 123/198 F |
| 8,128,356 | B2 * | 3/2012 | Higashimori | F01D 17/148 415/205 |
| 8,424,304 | B2 * | 4/2013 | Serres | F01D 17/105 60/602 |
| 8,857,178 | B2 * | 10/2014 | O'Hara | F01D 9/026 415/205 |
| 9,631,625 | B2 * | 4/2017 | Houst | F01D 9/026 415/205 |
| 2010/0037601 | A1 * | 2/2010 | Pierpont | F02M 26/44 60/323 |
| 2013/0121820 | A1 | 5/2013 | Yoshida et al. | |
| 2013/0283787 | A1 * | 10/2013 | Sakata | F02D 41/0007 60/605.1 |
| 2015/0204195 | A1 * | 7/2015 | Klaus | F01D 5/14 416/223 A |
| 2016/0281590 | A1 * | 9/2016 | Erdel | F01D 9/026 |

FOREIGN PATENT DOCUMENTS

| | | |
|---|---|---|
| JP | 2013136993 A | 7/2013 |
| JP | 2013142324 A | 7/2013 |
| KR | 20120064452 A | 6/2012 |
| WO | 2014038054 A1 | 3/2014 |
| WO | 2014099330 A1 | 6/2014 |
| WO | WO 2015077379 A1 * 5/2015 ............ F02B 37/025 |

* cited by examiner

PRESSURE-CHARGED COMBUSTION ENGINE HAVING A DOUBLE-FLOW TURBINE AND GROUPED CYLINDERS

CROSS REFERENCE TO RELATED APPLICATION

The present application claims priority to German Patent application No. 102015205998.7, filed on Apr. 2, 2015, the entire contents of which are hereby incorporated by reference for all purposes.

FIELD

The present description relates generally to a pressure-charged combustion engine having at least one cylinder head comprising at least two cylinders.

BACKGROUND/SUMMARY

Combustion engines have a cylinder block and at least one cylinder head, which are connected to one another in order to form the cylinders. The cylinder head is usually used to accommodate the valve gear. In order to control gas exchange, a combustion engine may require control elements, generally in the form of valves, and actuating devices for actuating these control elements. The valve actuating mechanism, which may be inclusive of the valves themselves, required to move the valves is referred to herein as the valve gear. In the course of gas exchange, the combustion chambers are filled with charge-air via the inlet openings.

According to the prior art, the exhaust lines adjoining the outlet ports are at least partially integrated into the cylinder head and may be combined to form a common overall exhaust line or may be combined in groups to form two or more overall exhaust lines. The combination of exhaust lines to form an overall exhaust line may be referred to generally and within the context of the present disclosure as an exhaust manifold.

The way in which the exhaust lines of the cylinders are combined in individual cases, i.e. the specific configuration of the exhaust gas discharge system, may depend primarily on which operating range of the combustion engine has priority, i.e. in respect of which operating ranges the operating behavior of the combustion engine is to be optimized.

In the case of pressure-charged combustion engines in which at least one turbine of an exhaust turbocharger is provided in the exhaust gas discharge system and which may be configured to have a satisfactory operating behavior in the lower engine speed or load range, i.e. in the case of relatively small exhaust gas volumes, "pulse turbocharging" may be the desired operational state.

In this case, the dynamic wave processes taking place in the exhaust gas discharge system, especially during gas exchange, may be used for the purpose of pressure charging as well as in the process of improving the operating behavior of the combustion engine.

The evacuation of the combustion gases from one cylinder of the combustion engine as part of the gas exchange process may be based primarily on two different mechanisms. If the outlet valve opens in a position relatively close to bottom dead center at the beginning of gas exchange, the combustion gases may flow at high speed through the outlet port into the exhaust gas discharge system, owing to the high pressure level prevailing in the cylinder toward the end of combustion and the associated high pressure difference between the combustion chamber and the exhaust line. This pressure-driven flow process may be accompanied by a high pressure peak, herein also referred to as a pre-exhaust surge, which may propagate along the exhaust line at the speed of sound, wherein the pressure may be decreased or reduced to a greater or lesser extent with increasing distance traveled, owing the reduction of pressure mainly to friction.

As gas exchange progresses, the pressures in the cylinder and in the exhaust line may equalize, and therefore the combustion gases may then be expelled primarily due to the stroke motion of the piston, rather than by the effect of pressure.

At low engine speeds, the pre-exhaust surge may be used in a certain selected manner for pulse charging, wherein high pressure pulses of short duration may be used in an effective manner for energy recovery in the turbine. In this way, high boost pressure ratios, such as high boost pressures on the inlet side, may be generated by means of exhaust turbocharging, even with only relatively small exhaust gas volumes, in particular at low engine speeds.

Pulse charging may provide a method in which the acceleration of the turbine wheel responds in a predetermined manner. For example, pulse charging may be used in increasing the turbine speed, which may fall considerably and noticeably to a user during idle operation of the combustion engine or at low load and which may often be raised again as far as possible without delay by means of the exhaust gas flow in the event of an increased load demand. The inertia of the turbine wheel and the friction in the shaft bearing assembly may generally delay acceleration of the turbine wheel to higher speeds of rotation and therefore, may provide an immediate increase in the boost pressure.

Other attempts to address pulse charging include providing a mixed flow turbocharger. One example approach is shown by Uhlenhake et al. in WO 2014099330A1. Therein, a turbocharger having an asymmetric twin scroll volute design is provided. The larger of the two volutes may eliminate the need for a waste gate and the associated actuator.

However, the inventors herein have recognized potential issues with such systems. As one example, in order to be able to use the dynamic wave processes that may take place in the exhaust gas discharge system, in particular the pre-exhaust surges, for pulse charging to improve the operating behavior of the combustion engine, the pressure peaks or pre-exhaust surges must be maintained in the exhaust gas discharge system. It may be particularly useful if the pressure pulses may be intensified in the exhaust lines or at least do not weaken each other or cancel each other out such as in destructive interference. It may be expedient therefore to group the cylinders in such a way or to combine the exhaust lines in such a way that the high pressures, in particular the pre-exhaust surges of the individual cylinders, may be maintained in the exhaust gas discharge system and that the mutual interference may be avoided as effectively as possible.

Pressure-charged combustion engines in which the cylinders are grouped are also within the scope of the present disclosure. According to the present subject matter, at least two cylinders may be configured in such a way that they form two groups, each group comprising at least one cylinder. The exhaust lines of the cylinders of each cylinder group in each case may come together to form an overall exhaust line, thereby forming an exhaust manifold. In this case, the cylinders may be grouped in such a way that the dynamic wave processes in the exhaust lines of the cylinders of a group have as small a negative effect on the other as possible.

In the case of a cylinder head having four cylinders arranged in series, one embodiment may combine two cylinders with an ignition spacing of 360° crank angle into one group. If, for example, ignition in the cylinders is initiated according to the ignition sequence 1-2-4-3 or according to the ignition sequence 1-3-4-2, one example may combine the outer cylinders into a first group and the inner cylinders into a second group.

In the context of cylinder grouping in order to obtain pulse charging, two further aspects must be taken into consideration, these being highly relevant with respect to the separation of the exhaust gas discharge systems of the cylinder groups. On the one hand, it is increasingly often the case that exhaust manifolds are being integrated into the cylinder head in order to participate in a liquid cooling system provided in the cylinder head an in order to avoid having to manufacture the manifolds from materials resistant to high thermal stress, which may be expensive. On the other hand, there may be a fundamental aim of arranging the turbine provided in the exhaust gas discharge system as close as possible to the outlet of the combustion engine such as close to the outlet ports of the cylinders for example. There are several reasons for this placement and each may include its own advantages, in particular because the exhaust gas paths between the cylinders and the turbine may be shortened. Not only may the path of the hot exhaust gases to the turbine be shortened, but the volume both of the individual exhaust manifolds and of the overall exhaust gas discharge system may likewise be reduced. In this way, improved use may be made of the exhaust gas enthalpy which may decisively be determined by the exhaust gas pressure and the exhaust gas temperature. The shortening of the lengths of the lines and the associated reduction in the exhaust gas volume upstream of the turbine wheel may improve the response of the turbine in at least one example embodiment.

However, the fact that the paths from the outlet ports of the cylinders to the turbine wheel of the provided turbine may be significantly shortened according to the concept described above and may also have potential issues. Owing to the arrangement of the turbine relatively close to the engine, the exhaust gas discharge systems of the cylinder groups may not be separated for long enough. Therefore, according to the present disclosure, the two overall exhaust lines of the cylinder groups may be connected to a double-flow turbine, wherein the two flows may be separated from one another, at least in some section or sections, in the direction of the at least one turbine wheel by a housing wall in continuation of the overall exhaust lines, thereby ensuring that the exhaust gas discharge system of the cylinder groups are also separated from one another over a longer distance.

Despite the optimization measures and features described above, pulse charging may require further improvements.

In one example, the issues described above may be addressed by a pressure-charged combustion engine having at least one cylinder head comprising at least two cylinders, in which each cylinder has at least one outlet port for discharging the exhaust gases from the cylinder via an exhaust gas discharge system, and an exhaust line adjoins each outlet port, at least two cylinders are configured in such a way that they form two groups, each comprising at least one cylinder, the exhaust lines of the cylinders of each cylinder group in each case come together to form an overall exhaust line, thereby forming an exhaust manifold, and the two overall exhaust lines are connected in such a way to a double-flow turbine of an exhaust turbocharger, said turbine comprising a turbine wheel mounted on a rotatable shaft in a turbine housing and equipped with rotor blades, that in each case one overall exhaust line is connected to one of the two flows of the turbine, wherein the two flows are separated from one another, at least in some section or sections, as are therefore also the exhaust gas discharge systems of the cylinder groups, in the direction of the turbine wheel by means of a housing wall in continuation of the overall exhaust lines, wherein each rotor blade of the turbine wheel has an inlet edge facing the flows, wherein a first inlet edge associated with a first flow and a second inlet edge associated with a second flow are connected to one another at a connection point and in this way form the inlet edge, which has an inflection at the connection point. In this way, the design and configuration of the rotor blade edge may make it possible to optimize the inlet edges facing the two flows such as the two subsections of the edge which may be associated with the two flows, independently of one another in respect of the associated flow, more specifically in respect of pulse charging.

As one example, a rotor blade edge of this kind may take into account the fact that the two flows generally comprise different geometrical configurations and therefore may also have different gas dynamics. Thus, the two flows may require differently shaped inlet edges in one embodiment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-3B are shown approximately to scale, although other relative dimensions may be used.

DETAILED DESCRIPTION

The following description relates to systems and methods relating to a pressure-charged combustion engine having at least one cylinder head comprising at least two cylinders.

Figure 1:
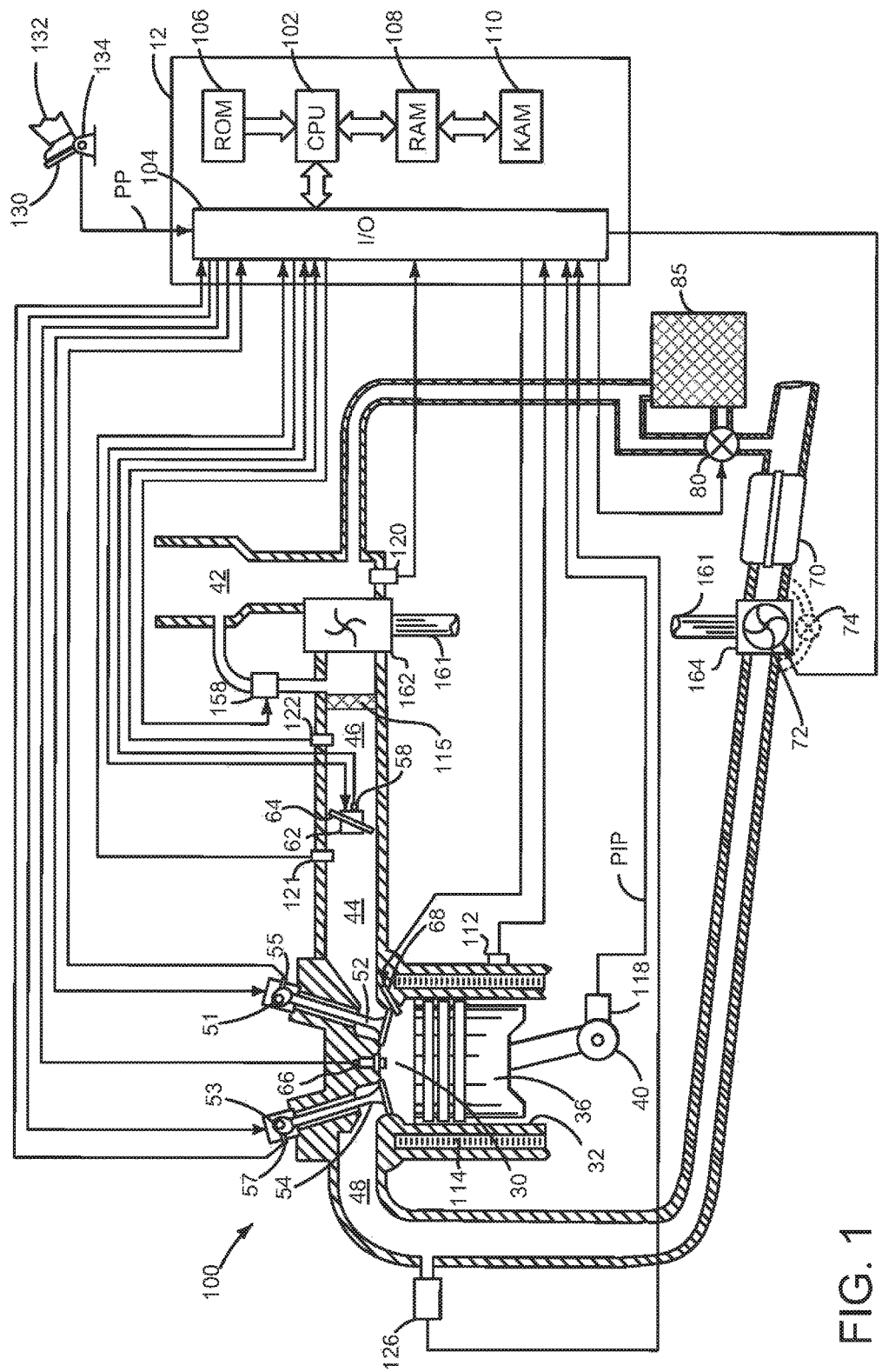
FIG. 1 shows a schematic depiction of an internal combustion engine.
Figure 2A:
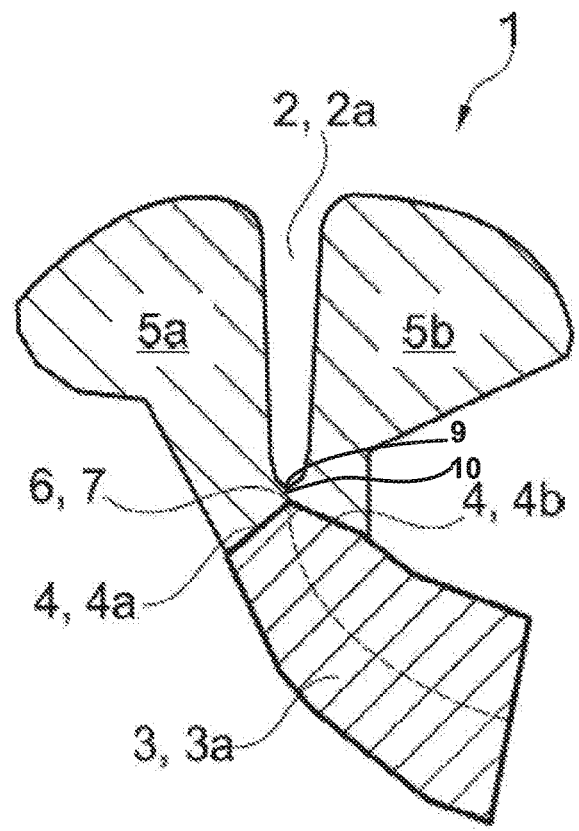
FIG. 2A shows a fragmentary and partially sectioned side view of the double-flow turbine in a first embodiment of the combustion engine.
Figure 2B:
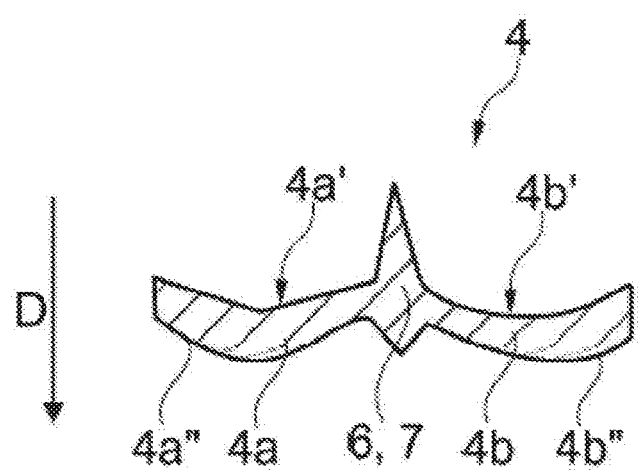
FIG. 2B shows a plan view of the inlet edge of a rotor blade of the turbine shown in FIG. 2A.
Figure 3B:
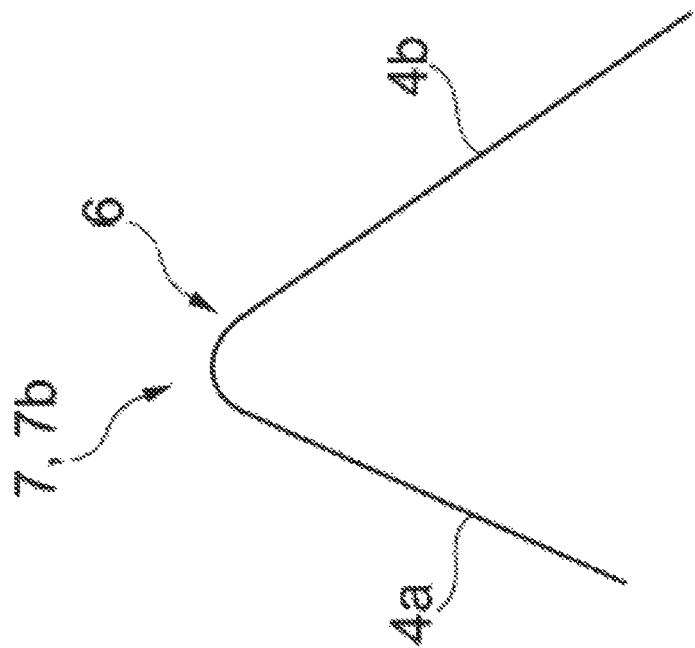
FIG. 3B shows a schematic side view of a rounded inflection.
Figure 3A:
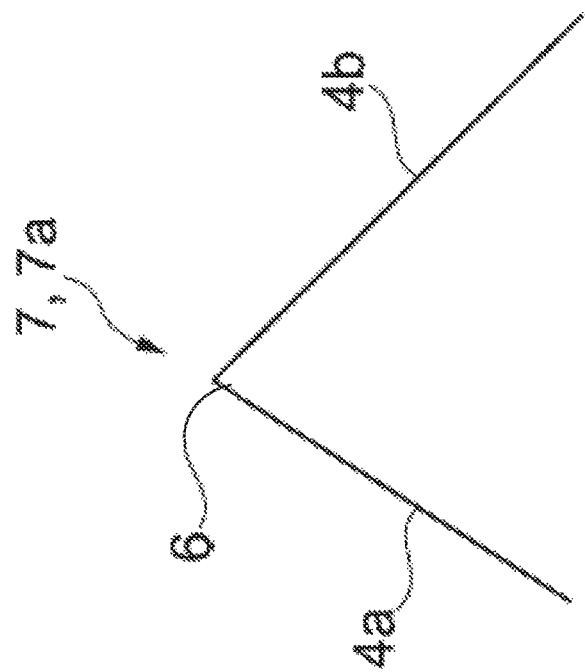
FIG. 3A shows a schematic side view of a sharp inflection.

As shown in FIG. 1, the present disclosure may be configured and adapted to any number of conventional internal combustion engines. FIG. 2A provides a fragmentary and partially sectioned side view of a double-flow turbine in a first exemplary embodiment of the combustion engine. FIG. 2B provides a view illustrating the inlet edge of a rotor blade of the turbine presented in FIG. 2A in a plan view. It will be understood that the plan view provided herein illustrates the embodiment provided in FIG. 2A in a plane corresponding to the flows in the direction of the rotor blades. FIG. 3A provides a schematic side view of a sharp inflection, and FIG. 3B provides a schematic side view of a rounded inflection.

In one embodiment of the combustion engine according to the present disclosure, a pressure-charged combustion engine configured to improve pulse charging is provided by a combustion engine comprising at least one cylinder head further comprising at least two cylinders, in which each cylinder has at least one outlet port for discharging the exhaust gases from the cylinder via an exhaust gas discharge system, and an exhaust line adjoins each outlet port, at least two cylinders are configured in such a way that they form two groups, each comprising at least one cylinder, the exhaust lines of the cylinders of each cylinder group in each case come together to form an overall exhaust line, thereby forming an exhaust manifold, and the two overall exhaust lines are connected in such a way to a double-flow turbine of an exhaust turbocharger, said turbine comprising a turbine wheel mounted on a rotatable shaft in a turbine housing and equipped with rotor blades, that in each case one overall exhaust line is connected to one of the two flows of the turbine, wherein the two flows are separated from one another, at least in some section or sections, as are therefore also the exhaust gas discharge systems of the cylinder groups, in the direction of the turbine wheel by means of a housing wall in continuation of the overall exhaust lines, and wherein each rotor blade of the turbine wheel has an inlet edge facing the flows, wherein a first inlet edge associated with a first flow and a second inlet edge associated with a second flow are connected to one another at a connection point an in this way, form the inlet edge, which has an inflection at the connection point.

As one embodiment of the combustion engine according to the present disclosure, the inlet edge (the edge facing the flows), of each rotor blade has two subsections, namely a first inlet edge associated with the first flow and second inlet edge associated with the second flow, said edges being connected at a connection point. In this way, the configuration of the rotor blade edges may enable the inlet edges facing the two flows to be improved, i.e. the two subsections of the edge which are associated with the two flows, independently of one another in respect of the associated flow, more specifically in respect of pulse charging.

A rotor blade edge of this design may take into consideration the fact that the two flows may generally comprise different and distinct geometrical configurations and therefore, may also comprise different gas dynamics. Thus, the two flows may require differently shaped inlet edges.

At the connection point, which may be situated in one embodiment opposite or close to the housing wall, the rotor blade edge may comprise a substantially triangular shaped inflection. In one embodiment, the inflection may define a sharp triangular inflection wherein the tip of the rotor blade may point outward such that it is oriented in the direction of the flows or housing wall. In another embodiment, an inflection may comprise two interconnected legs, which may further form an angle of less than 180°. In other embodiments, the two interconnected legs may form an angle of less than 90° and in still a further embodiment, the two interconnected legs may form an angle of less than 60°. In the embodiments described above, the legs may form at least one region of the two subsections of the two inlet edges associated with the two flows.

A rotor blade edge configured in accordance with the present disclosure may improve pulse charging, especially when using a "mixed-flow turbine," in which the velocity vector of the incident flow may comprise both a radial velocity component and an axial velocity component. Compared to a pure radial turbine, in which the incident flow may be precisely radial, the mixed-flow turbine is distinguished by a lower inertia, which may result from the smaller diameter of the turbine wheel.

In one example embodiment of the combustion engine according to the present disclosure, at least two cylinders may be configured in such a way that they form two groups, each comprising at least one cylinder. Since a group may thus also comprise only a single cylinder inclusive of a single outlet port, the exhaust manifold of a group may also comprise a singular exhaust line of an outlet port of a cylinder. In this case, there may be no combination per se of the exhaust line(s) to form a manifold.

As a further embodiment, the double-flow turbine may be the turbine of an exhaust turbocharger. An exhaust turbocharger may comprise a turbine arranged in the exhaust gas discharge system as well as a compressor arranged within the intake system or intake manifold.

In this way, an exhaust turbocharger, when compared with a mechanical charger for example, may not require a mechanical connection for power transmission between the charger and the combustion engine. Whereas a mechanical charger may draw all the energy required to drive it from the combustion engine and thus, may reduce power made available to the vehicle. A mechanical charger therefore, may present drawbacks with regard to overall efficiency. An exhaust turbocharger however may utilize the exhaust gas energy of expelled gases and the overall efficiency of the engine may be improved.

A charge-air cooling system may be provided in at least one example by means of which the compressed charge air is cooled before entry into the cylinders. The charge-air cooling system may further increase the density of the charge air supplied. In this way, cooling may likewise contributed to compression as well as to better or increased filling of the combustion chambers which may further contribute to improved volumetric efficiency. In one embodiment, the charge air cooler may be equipped with a bypass line in order to provide an ability to bypass the charge air cooler when required such as after a cold start.

The torque characteristic of the pressure-charged combustion engine may further be improved in one embodiment by providing a plurality of chargers, exhaust turbochargers and/or mechanical chargers in parallel and/or in series in the exhaust gas discharge system.

Further embodiments of the pressure-charged combustion engine according to the present disclosure may comprise a connection point as defined above that may lie opposite the housing wall. The two subsections of the inlet edge of each rotor blade may then correspond to the associated flows. The first inlet edge associated with the first flow may cover the first flow, whereas the second inlet edge associated with the second flow may cover the second flow.

Some embodiments of the pressure-charged combustion engine may comprise a sharp inflection and still other embodiments of the pressure-charged combustion engine may comprise a rounded inflection wherein the rounded inflection may further comprise two interconnected legs, which may form an angle of less than 180°. In at least one embodiment, the pressure-charged combustion engine may comprise an inflection which is directed outward away from the rotatable shaft. The inflection may be directed toward the direction of the flows or of the housing wall and may be oriented counter to the incident flow.

Turning now to FIG. 1, an example internal combustion engine 100 is illustrated. The internal combustion engine 100 of FIG. 1 may be controlled via an electronic engine controller 12 and may further include at least one combustion chamber 30. Combustion chamber 30 is shown in this figure communicating with an intake manifold 44 and an exhaust manifold 48 via respective intake valves 52 and exhaust valves 54. Each intake and exhaust valve may be operated by an intake cam 51 and an exhaust cam 53 respectively. The position of intake cam 51 may be determined by an intake cam sensor 55. Further, the position of the exhaust cam 53 may be determined by an exhaust cam sensor 57.

A fuel injector 66 is shown positioned such that it may inject fuel directly into combustion chamber 30, which is known to those skilled in the art as direct injection. Fuel injector 66 may deliver fuel in proportion to a pulse width from the controller unit 12. Fuel may be delivered to the fuel injector 66 by a fuel system (not shown) including a fuel tank, a fuel pump, and a fuel rail. Fuel pressure delivered to the combustion chamber 30 by the fuel system may be adjusted by varying a position valve and regulating the flow to a fuel pump. In addition, a metering valve may be located in or near the fuel rail for a closed loop fuel control. A pump metering valve may further regulate fuel flow to the fuel pump, thereby reducing fuel pumped to a high pressure fuel pump.

An intake manifold 44 is illustrated in FIG. 1 communicating with an optional electronic throttle 62 which may adjust the position of a throttle plate 64 in order to control air flow from an intake boost chamber 46. In one embodiment, the engine system 100 of the disclosure may include a turbine 164 and a compressor 162. The compressor 162 may draw air from the intake 42 in order to supply the boost chamber 46. Exhaust gases may spin the turbine 164 which is coupled to compressor 162 via a shaft 161. A charge air cooler 115 may also be provided in at least one embodiment, and the charge air cooler 115 may cool air compressed by the compressor 162. Compressor speed may be adjusted via adjusting a position of variable vane control 72 or compressor bypass valve 158. In alternative examples, a waste gate 74 may be used in addition to a variable vane control 72. The variable vane control 72 may adjust a position of variable geometry turbine vanes. Exhaust gases may pass through the turbine 164 and impart an increased force on turbine 164 when vanes are in a closed position. Compressor bypass valve 158 may allow compressed air at the outlet of compressor 162 to be returned to the input of compressor 162. In this way, the efficiency of compressor 162 may be reduced so as to affect the flow of compressor 162 and reduce intake manifold pressure.

Combustion within the engine system 100 provided may be initiated in combustion chamber 30 when fuel ignites via compression ignition as piston 36 approaches a dead-center compression stroke. In some examples, a universal exhaust gas oxygen (UEGO) sensor 126 may be coupled to exhaust manifold 48 upstream of an emissions device 70. In other examples, the UEGO sensor may be located downstream of one or more exhaust after treatment devices. Further, in some examples, the UEGO sensor may be replaced by a NOx sensor which may be inclusive of both NOx and oxygen sensing elements.

At lower engine temperatures, a glow plug 68 may convert electrical energy into thermal energy so as to raise a temperature in the combustion chamber 30. By raising the temperature of the combustion chamber 30, it may be easier to ignite a cylinder air-fuel mixture via compression. Controller 12 may then adjust an amount of electrical power supplied to glow plug 68. Glow plug 68 may protrude into the cylinder and it may further include a pressure sensor integrated with the glow plug for determining pressure within the combustion chamber 30.

An emission control device 70 may be provided in at least one example embodiment and may be inclusive of a particulate filter and catalyst bricks. In another example embodiment, multiple emission control devices, each comprising multiple bricks, may be used. Further, emission control device 70 may include an oxidation catalyst in one example. In other examples, the emission control device may include a lean NOx trap or a selective catalyst reduction (SCR), and/or a diesel particulate filter (DPF). The emission device 70 of engine system 100 may be placed downstream in the engine's exhaust system relative to a turbine 164 such that the exhaust gas supplied to the turbine 164 may be converted into a safe form prior to its release into the atmosphere.

In another example, exhaust gas recirculation (EGR) may be provided in the engine via an EGR valve 80. EGR valve 80 may be a three-way valve that closes or opens to block or allow exhaust gas to flow from downstream of the emissions device 70 to a location in the engine air intake system upstream of the turbine 164 to intake manifold 44. EGR may bypass the EGR cooler 85 in one example, or alternatively, EGR may be cooled via passing through EGR cooler 85. In other examples, high pressure and low pressure EGR systems may be provided.

The controller 12 as provided in FIG. 1 is shown as a conventional microcomputer including: a microprocessor unit 102, input and output ports 104, read-only memory 106, random access memory 108, keep alive memory 110, and a conventional data bus. Controller 12 is shown receiving various signals from sensors coupled to engine 100, in addition to those signals previously discussed, including: engine coolant temperature (ECT) from temperature sensor 112 coupled to a cooling sleeve 114; a position sensor 134 coupled to an accelerator pedal 130 for sensing accelerator position as adjusted by a driver 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed though a sensor is not shown in FIG. 1 for processing by controller 12. In one example embodiment of the present disclosure, an engine position sensor 118 may produce a predetermined number of equally spaced pulses for every revolution of the crankshaft from which engine speed (RPM) may be determined. The controller 12 of the engine system 100 may further act to control and subsequently actuate the valves described above.

The controller 12 receives signals from the various sensors of FIG. 1 and employs the various actuators of FIG. 1 in order to adjust engine operation based on the received signals and instructions stored on a memory of the controller.

For example, adjusting the electronic throttle 62 may include adjusting the position of a throttle plate 64 via a signal from the controller 12 in order to adjust the flow volume and pressure into the intake manifold 44.

In some embodiments of the pressure-charged combustion engine, the first inlet edge may comprise a concave side which may from a part of a rear side of the rotor blade as the shaft revolves. This configuration may take into account cases in which the exhaust gas flow may be constricted as it emerges from the first flow and subsequently broadens out again before entering the turbine wheel. In other embodiments, a first inlet edge may comprise a convex side, which may form part of a front side of the rotor blade as the shaft revolves.

One embodiment of the pressure-charged combustion engine, the second inlet edge may comprise a concave side which forms part of a rear side of the rotor blade as the shaft revolves. In another embodiment, the second inlet edge may comprise a convex side which may form part of a front side of the rotor blade as the shaft revolves.

As one example, the housing wall of the pressure-charged combustion engine may comprise an immovable wall that may be fixedly connected to the housing. In this way, the housing wall may ensure that the heat introduced into the housing wall by the hot exhaust gas is dissipated in a useful manner and to a sufficient extent into and via the housing. Further embodiments may provide a pressure-charged combustion engine in which the two flows may be separated from one another as far as the turbine wheel by means of the housing wall, as are therefore also the exhaust gas discharge systems of the cylinder groups may be expedient. In the present example, the two flows of the turbine and hence, the exhaust gas discharge systems of the associated cylinder groups, may be substantially separated from one another, resulting in a case in which each flow communicates only with the exhaust lines of the cylinder group from which it is originally fed. This may further assist pulse charging by using the pressure peaks propagating in the exhaust manifolds.

Embodiments of the pressure-charged combustion engine in which the housing wall separating the two flows from one another may have a free, tongue-type end on the turbine wheel side and ends at a distance from the turbine wheel, thereby forming a tongue clearance 10 (see FIG. 2A), are also provided. In this case, the two flows may be connected to one another or may be connected to one another temporarily by means of a transfer channel at an end adjacent to the turbine wheel. In this way, tongue clearance 10 may be defined or obtained as the clearance between the free tongue-type end of the housing wall separating the adjacent flows from one another and the turbine wheel such as the blades thereof. The transfer channel may allow interaction between the flows.

With respect to FIG. 2A, a fragmentary and partially sectioned side view of the double-flow turbine 1 in a first embodiment of the combustion engine is provided. The turbine 1 may comprise a turbine housing 2 in which a turbine wheel 3 may be mounted on a rotatable shaft and may correspond to turbine 164 of FIG. 1. The double-flow turbine 1 illustrated is shown as a twin-flow turbine 1, which may be distinguished by the fact that the two flow regions 5a, 5b may be arranged adjacent to one another and surround the turbine wheel 3, which may be equipped with rotor blades 3a, in a spiral at equal radii, at least along an arcuate segment. The two flow regions 5a, 5b may be arranged in the housing 2 at equal radial distances from the shaft of the turbine 1 and may further be separated from one another towards the turbine wheel 3 by means of a housing wall 2a on the turbine wheel side, the housing wall 2a may include a free, tongue-type end, which may extend as close as possible to the turbine wheel 3.

Each rotor blade 3a of the turbine wheel 3 may comprise an inlet edge 4, which may face the flows 5a, 5b and may have two subsections 4a, 4b, namely a first inlet edge 4a associated with the first flow 5a and a second inlet edge 4b associated with the second flow 5b, which may be connected to one another at a connection point and in this way, may form the inlet edge 4 which may have an inflection 7 at the connection point 6.

At the connection point 6, which may be situated opposite and close to the housing wall 2a, the rotor blade edge 4 may include a sharp, triangular shaped inflection 7, 7a in the present case, wherein the tip may be directed outward, i.e. may be oriented in the direction of the flows 5a, 5b or housing wall 2a. A rotor blade edge 4 configured in accordance with the present disclosure may improve the incident flow conditions upon entry into the rotor blades 3a and therefore, may also improve pulse charging.

In addition to the tongue clearance 10 mentioned briefly above, embodiments of the pressure-charged combustion engine in which the tongue clearance 10 is variable may also be provided. Further, embodiments in which the two flows of the turbine may be connected to one another within the turbine housing by opening at least one opening positioned upstream of the at least one turbine wheel are within the scope of the present subject matter.

Pulse charging may however present some potential issues. Thus, gas exchange may generally deteriorate over time owing to the pressure pulses in the exhaust gas discharge system. Moreover, it must be taken into account that a turbine may be operated in the most effective way without being subject to pulsating and alternating partial loads. In order to be able to operate a turbine provided downstream of the cylinders in the exhaust gas discharge system in the optimum manner at high engine speeds, the turbine should be subjected to an exhaust gas pressure which is as far as possible constant over time, for which reason a pressure which varies little upstream of the turbine may be provided in order to implement "constant-pressure charging."

By means of a correspondingly large exhaust gas volume upstream of the turbine, the pressure pulsations in the exhaust lines may be smoothed. To this extent, grouping of the cylinders where the exhaust lines are combined into groups, thereby dividing the volume of the exhaust gas discharge system upstream of the turbine into a plurality of partial volumes may be counterproductive.

On the contrary, it may be useful in respect of constant-pressure charging, to enlarge the exhaust gas volume of the exhaust gas discharge system upstream of the turbine in order to minimize the pressure fluctuations.

Turning now to FIG. 2B, this figure shows the inlet edge 4 of a rotor blade of the turbine shown in FIG. 2A in a plan view, i.e. the scene from the flows in the direction of the rotor blades. The first inlet edge 4a may comprise a concave side 4a', which may form part of a rear side of the rotor blade as the shaft revolves. The direction of rotation D of the blade or the edge 4 is indicated by an arrow. A convex side 4a" of the first inlet edge 4a may form part of a front side of the rotor blade as the shaft revolves.

The second inlet edge 4b may comprise a concave side 4b' which may form part of a rear side of the rotor blade as the shaft revolves. The direction of rotation D of the blade or the edge 4 is again indicated by an arrow. A convex side 4b" of the second inlet edge 4b may form a front side of the rotor blade as the shaft revolves. The connection point 6 at which the two inlet edges 4a, 4b are connected to one another and form an inflection 7 is also visible in the plan view.

As compared with connecting the two exhaust manifolds, connecting the two flows of the turbine may serve to increase the distance in terms of exhaust line provision between one cylinder of one group and one cylinder of the other group by arranging the connecting opening of the exhaust systems of the two cylinder groups further away from the outlet ports of the cylinders. The risk of mutual interference during gas exchange may thereby be counteracted.

The above-described embodiment may be expedient in the case of pressure-charged combustion engines in which the exhaust lines of the cylinders of each cylinder group in each case come together within the cylinder head to form an overall exhaust line, thereby forming an exhaust manifold, since connecting the manifolds may create a connection which may be positioned substantially close to the outlet ports of the cylinders. Nevertheless, embodiments of the pressure-charged combustion engine in which the exhaust manifolds of the cylinder groups may be connected to one another by opening at least one opening may also be within the scope of the present disclosure.

In FIG. 3A, a schematic side view of a sharp inflection 7, 7a is provided. The two inlet edges 4a, 4b may be connected to one another at the connection point 6 and may further form an angle at the connection point 6 therefore forming a sharp inflection 7. In one embodiment, the exhaust lines of the cylinders of each cylinder group in each case may be joined together within the cylinder head in order to form an overall exhaust line, thereby forming two exhaust manifolds.

The double-flow turbine provided in the exhaust gas discharge system may then be arranged substantially close to the outlet of the combustion engine, i.e. close to the outlet ports of the cylinders. In this way, the exhaust lines between the cylinders may be shorter. Since the path to the turbine for the hot exhaust gas may be shorter, the volume of the exhaust manifolds or of the exhaust gas discharge system upstream of the turbine may also be reduced. The thermal inertia of the exhaust gas discharge system may likewise be reduced through a reduction in the mass and length of the exhaust lines involved. In this way, the exhaust gas enthalpy of the hot exhaust gases, which may be decisively determined by the exhaust gas pressure and the exhaust gas temperature, may be used in a manner so as to ensure a rapid response of the turbine.

The measure discussed above may further lead to a compact construction of the cylinder head and therefore, of the combustion engine according to the present subject matter and may allow for dense packaging of the entire drive unit. Moreover, it may be possible in this way to participated in a liquid cooling system that may be provided in the cylinder head, which may make it unnecessary to manufacture the manifolds from materials which are resistant to high thermal stress and may therefore be expensive relative to other materials not resistant to high thermal stress.

The shortening of the line lengths and the associated reduction of the exhaust gas volume upstream of the turbine may furthermore assist pulse charging in the lower load or engine speed range.

Additional embodiments of the pressure-charged combustion engine in which the rotor blades of the turbine wheel may be connected to one another by means of an annular band extending around the shaft are also provided. The band may be comprised of a singular piece or of modular construction, wherein a band of modular construction comprising a plurality of band segments may connect together in each case of two adjacent rotor blades of the turbine wheel by means of one band segment. The stiffness of the turbine wheel may be increased by the annular band, thereby potentially improving vibration behavior and reducing noise emission. In such a case, an embodiment in which the annular band is arranged on the inlet side is envisioned.

It may then be possible, for example, to use the band in order to separate the exhaust gas discharge systems of the cylinder groups beyond the inlet to the turbine wheel, at least in some section or sections, as the exhaust flows through the turbine wheel or rotor blades. This may lead to a lengthening of the distances from the outlet ports of the cylinders to the connection point of the exhaust gas discharge systems of the cylinder groups in order to form a common exhaust system.

In this connection, embodiments of the pressure-charged combustion engine in which the annular band projects out from the inlet edge of each rotor blade in the region of the connection point are provided. In this case, a gap may be provided between the band and the housing wall. This gap may be necessary to ensure that the turbine wheel may rotate with as little loss as possible such as a case with reduced friction.

On one hand, the gap may be sufficiently large so as to allow free revolution of the turbine wheel, but on the other hand, it may also be as narrow as possible so as to ensure that the degree of separation of the flows is as great as possible such that interaction may be substantially prevented.

Embodiments of the pressure-charged combustion engine in which the annular band may be coated originally with a wearing material at least in a region opposite the housing wall, are also provided. The coated band may then originally have a certain increased size before the assembly of the turbine without the increased size being detrimental. During operation, sufficient material may be abraded or removed owing to friction as the turbine wheel revolves within a formed gap. After a run-in process, the gap formed in this way may exhibit precisely the required reduced gap dimension.

As one example, an annular band forming a continuation of the housing wall separating the two flows from one another and therefore separating the exhaust gas discharge systems of the cylinder groups is provided in one embodiment.

With respect to FIG. 3B, a rounded inflection 7 is illustrated in a side view. The two inlet edges 4a, 4b may be connected to one another at the connection point 6 and may form an arc shape at the connection point 6. In this way, a rounded inflection 7 may be achieved.

Embodiments of the pressure-charged combustion engine in which the double-flow turbine comprises a twin-flow turbine, in which the two flows which are arranged adjacent to one another, surround the turbine wheel in a spiral at equal radii at least along an accurate segment, are provided within the scope of the present disclosure. Further, embodiments of the pressure-charged combustion engine in which the double-flow turbine comprises a mixed-flow turbine are also within the scope of the present subject matter.

Figure 4:
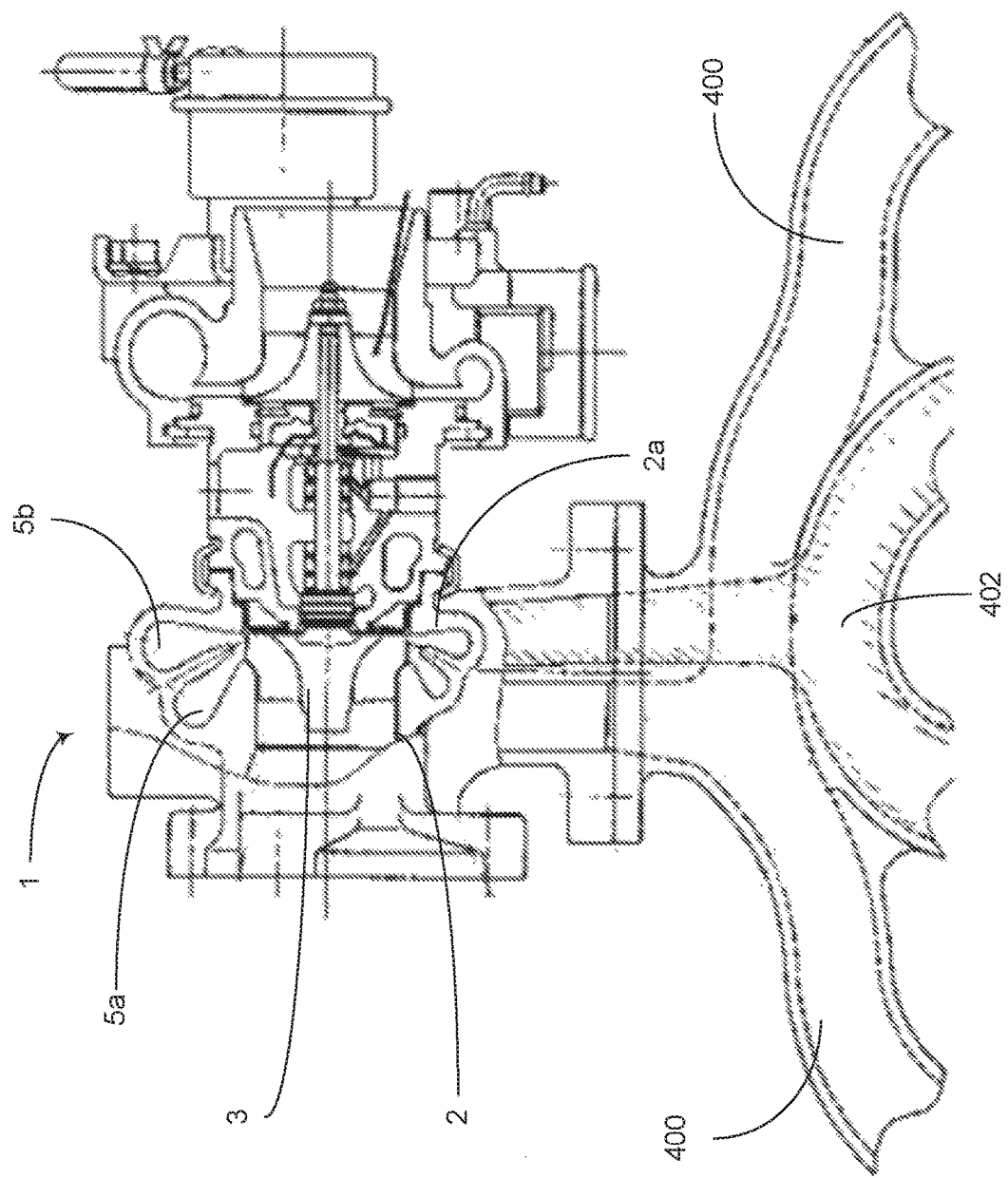
FIG. 4 shows an example double-flow turbine in communication with an internal combustion engine.

Turning now to FIG. 4, this figure illustrates an example double-flow turbine 1 communicatively connected to an internal combustion engine. In such an example, the housing wall 2a of the pressure-charged engine may comprise an immovable wall 2a that may be fixedly connected to the housing 2. In this way, the housing wall may ensure that the heat introduced into the housing wall by the hot exhaust gases may be dissipated in a useful manner. Further embodiments may provide a pressure-charged combustion engine in which the two flows may be separated from one another as far as the turbine wheel by means of the housing wall. The exhaust gas discharge systems of the cylinder groups may also be separated from one another via the housing wall as shown in FIG. 4.

In the embodiment illustrated in FIG. 4, the two flows 5a, 5b, of the turbine may be substantially separated from one another, wherein each flow 5a, 5b may communicate only with the exhaust lines of the cylinder group from which it is originally fed. This may further assist pulse charging by utilizing the pressure peaks propagating in the exhaust manifold(s).

In this view, it can be seen that the double-flow turbine 1 comprises two flows 5a, 5b which are fed via a series of cylinder groups 400, 402. The cylinder groups 400, 402 expel and direct hot exhaust gases into each flow scroll 5a, 5b after firing and burning off fuel within the combustion chamber. The flows are then directed toward the turbine wheel 3 which is contained within the turbine housing 2. The exhaust gas flows then cause the turbine wheel 3 to rotate driving an associated shaft which powers a compressor. In typical double-flow turbines, the leading edge of the rotor blade may be a limiting factor in improving performance of the turbine in some embodiments.

Figure 5A:
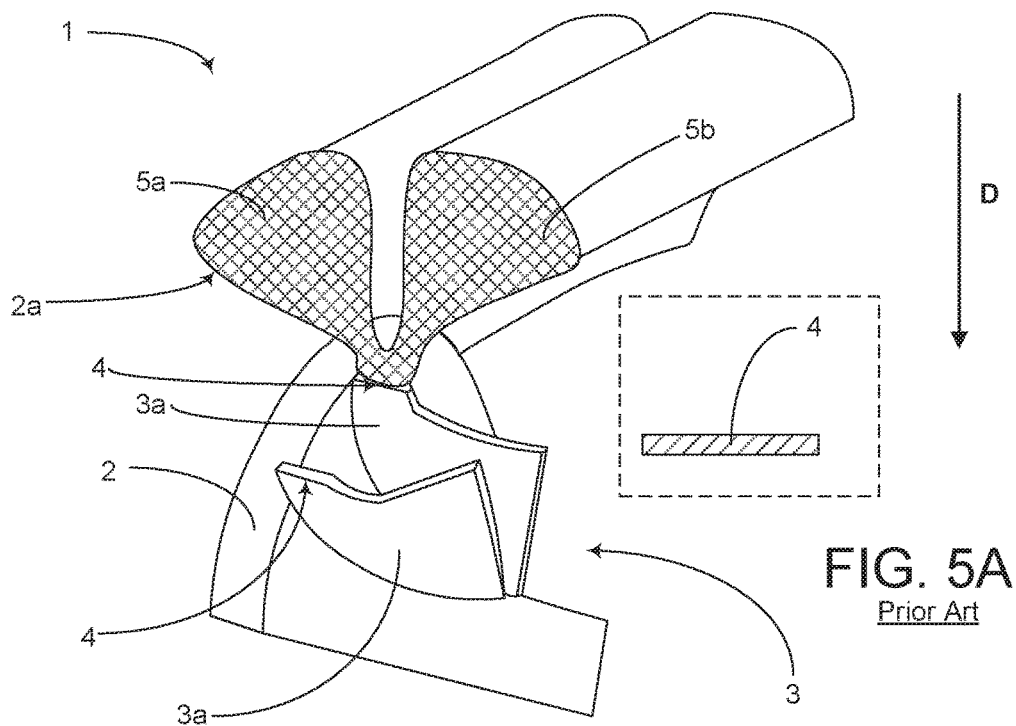
FIG. 5A shows an example double-flow turbine including rotor blades with a standard straight edge profile.

With respect to FIG. 5A, a double-flow turbine and turbine wheel of prior art is shown. As shown in the broken line box on the right, the rotor blade edge 4 comprises a straight leading edge profile. As evidenced by the figure, as the rotor blades rotate away from the two flows 5a, 5b, the flat leading edge 4 contacts both flows while providing a small gap in the area of flow containment which may affect pulse charging efficiency of the turbine.

It will be understood that the turbine wheel 3 and the rotor blades 3a rotate away from the two flows responsive to the forces exerted on the rotor blades 3a by the exhaust gas flows 5a, 5b. It will be appreciated that a direction of rotation is provided in FIGS. 5A and 5B and is denoted by the downward facing vertical line labeled D.

As the two flows 5a, 5b impart a force upon the turbine wheel 3, the pressures of each flow may be variable and distinct. This may result in an increase or decrease in pressures of each flow relative to the other. By providing a rotor blade 3a comprising a straight leading edge profile, the potential issues experienced by double-flow turbines may not be fully addressed.

Figure 5B:
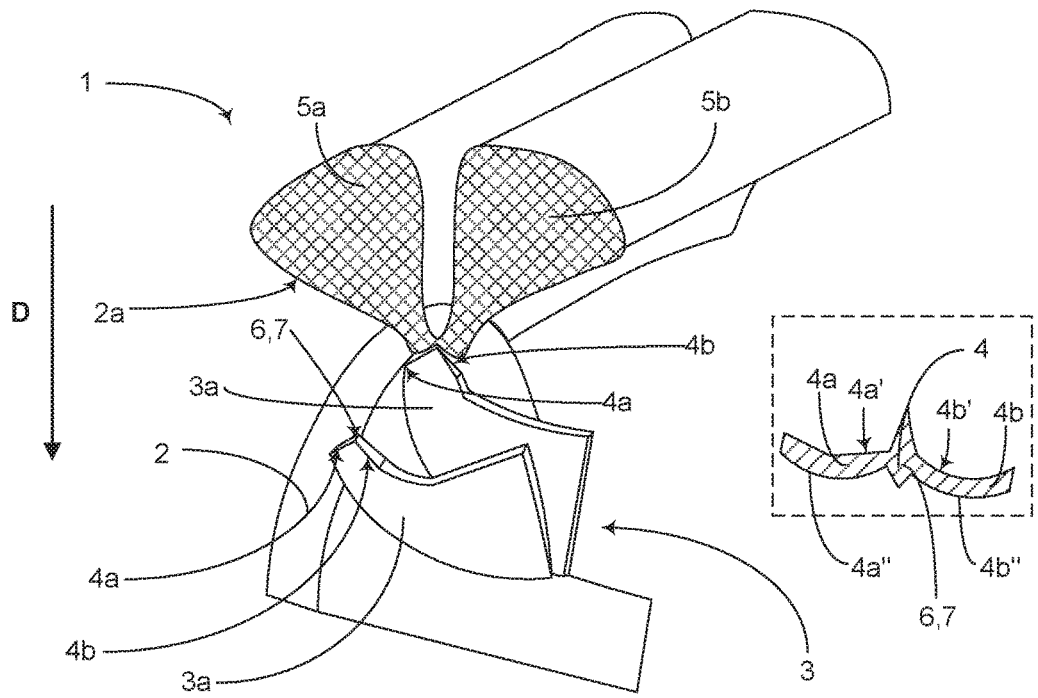
FIG. 5B shows an example double-flow turbine including rotor blades with dual edges.

Turning now to FIG. 5B, a double-flow turbine 1 and turbine wheel 3 according to the present disclosure is provided. The double-flow turbine 1 comprises a turbine housing 2 which includes a housing wall 2a, a turbine wheel 3 including rotor blades 3a and two flows 5a, 5b. As shown in the broken line box to the right, the rotor blade 4 of the present disclosure may comprise a first inlet edge 4a, a concave side of the first inlet edge 4a', a convex side of the first inlet edge 4a", a second inlet edge 4b, a concave side of the second inlet edge 4b', and a convex side of the second inlet edge 4b". The concave sides 4a', 4b' may form a portion of a rear side of the rotor blade as the shaft revolves. Again, the direction of rotation D of the blade or the edge 4 is indicated by a downward facing vertical arrow. Conversely, the convex sides 4a", 4b" of the inlet edges 4a, 4b may comprise at least a portion of a front side of the rotor blade as the shaft revolves.

The embodiment provided in FIG. 5B may serve to improve pulse charging operation by adjusting the shape of the rotor blades 3a and particularly, the shape of the rotor blade edges 4. As shown in the figure, the rotor blade edge 4 may be extended in the middle of the edge which contacts the flows 5a, 5b. For example, the rotor blade edges 4 may comprise a first inlet edge 4a and a second inlet edge 4b. The first inlet edge 4a may correspond substantially to a first provided flow 5a and the second inlet edge 4b may correspond substantially to a second provided flow 5b. By providing a rotor blade edge 4 that matches the shape of or corresponds substantially to the shape of the twin-scroll or double-flow turbine flow channels, the efficiency of pulse charging operation may be improved.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

In this way, the design and configuration of the rotor blade edge may make it possible to optimize the inlet edges facing the two flows independently of one another with respect to pulse charging.

An example technical effect of providing a pressure-charged combustion engine in which the two flows are separated from one another as far as the turbine wheel by means of the housing wall and the exhaust gas discharge systems of the cylinder groups is that the two flows the turbine and the exhaust gas discharge systems of the associated cylinder groups may result in a case in which each flow communicates only with the exhaust lines of the cylinder group form which it is originally fed. This may further assist in pulse charging by using the pressure peaks propagating in the exhaust manifolds.

As one embodiment, a pressure-charged combustion engine having at least one head is provided, comprising at least two cylinders in which each cylinder has at least one outlet port for discharging the exhaust gases from the cylinder via an exhaust gas discharge system, and an exhaust line adjoins each outlet port, at least two cylinders are configured in such a way that they form two groups, each comprising at least one cylinder, the exhaust lines of the cylinders of each cylinder group in each case come together to form an overall exhaust line, thereby forming an exhaust manifold, and the two exhaust lines are connected in such a way to a double-flow turbine of an exhaust turbocharger, said turbine comprising a turbine wheel mounted on a rotatable shaft in turbine housing and equipped with rotor blades, that in each case on overall exhaust line is connected to one of the two flows of the turbine, wherein the two flows are separated from one another, at least in some section or sections, in the direction of the turbine wheel, as are therefore also the exhaust gas discharge systems of the cylinder groups, by means of a housing wall in continuation of the overall exhaust lines, wherein each rotor blade of the turbine wheel has an inlet edge facing the flows, wherein a first inlet edge associated with a first flow and a second inlet edge associated with a second flow are connected to one another at a connection point and in this way for the inlet edge, which has an inflection at the connection point. The pressure-charged combustion engine may additionally or alternatively comprise a connection point that lies opposite the housing wall. In any of the preceding example embodiments comprising a pressure-charged combustion engine, the inflection point may be sharp. In some embodiments, the inflection of the inlet edge of each rotor blade may additionally or alternatively be rounded. In any of the preceding embodiments, the pressure-charged combustion engine may additionally or optionally include an inflection that points outward. Another embodiment of the pressure-charged combustion engine may optionally include any of the preceding examples and may additionally include wherein the first inlet edge has a concave side, which forms part of a rear side of the rotor blade as the shaft revolves. The first inlet edge in some embodiments may additionally or alternatively comprise a convex side which forms part of a front side of the rotor blade as the shaft revolves. An additional embodiment of the pressure-charged combustion engine may alternatively or additionally comprise a second inlet edge having a concave side which forms part of a rear side of the rotor blade as the shaft revolves. The second inlet edge in one embodiment of the pressure-charged combustion engine may alternatively or additionally include a convex side which forms part of a front side of the rotor blade as the shaft revolves.

Any of the preceding example embodiments may additionally or alternatively include a housing wall which is an immovable wall connected firmly to the housing. One embodiment may optionally include any of the preceding example embodiments and may additionally or alternatively comprise two flows wherein the two flows are separated from one another as far as the turbine wheel by means of the housing wall as are therefore also the exhaust gas discharge systems of the cylinder groups. The housing wall of the pressure-charged combustion chamber in one embodiment may include any of the preceding examples and may additionally or alternatively comprise a housing wall separating the two flows from one another, and may comprise a free, tongue-type end on the turbine wheel side and ends at a distance from the turbine wheel thereby forming a tongue clearance. As one example embodiment, the pressure-charged combustion engine may additionally or alternatively comprise a variable tongue clearance. The two flows of the pressure-charged combustion engine may additionally or alternatively include wherein the two flows of the turbine may be connected to one another within the turbine housing by opening at least one opening upstream of the turbine wheel. In a further embodiment which may include any of the preceding examples, may additionally or alternatively include the rotor blades of the turbine wheel connected to one another by means of an annular band extending around the shaft. One embodiment may optionally include any of the preceding examples, and may further feature an annular band wherein the annular band is arranged on the inlet side. An additional example embodiment may additionally or optionally include an annular band wherein the annular band projects from the inlet edge of each rotor blade in the region of the connection point. The annular ring may additionally or alternatively be coated originally with a wearing material, at least in a region opposite the housing wall in one embodiment. In any of the preceding examples, the annular ring may additionally or alternatively form a continuation of the housing wall separating the two flows from one another and hence separates the exhaust gas discharge systems of the cylinder groups. In one embodiment, which may optionally include any of the preceding example embodiments, the double-flow turbine is a twin-flow turbine. An additional embodiment may optionally include the features of any of the preceding examples and may further comprise a double-flow turbine wherein the turbine is a mixed-flow turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A pressure-charged combustion engine having at least one cylinder head comprising:
   at least two cylinders, in which each cylinder has at least one outlet port for discharging exhaust gases from the cylinder via an exhaust gas discharge system, and exhaust lines, each of the exhaust lines adjoins each outlet port,
   the at least two cylinders configured in such a way that they form two groups, each group comprising at least one cylinder,
   the exhaust lines of the cylinders of each cylinder group coming together to form two overall exhaust lines, and
   the two overall exhaust lines connected to a double-flow turbine of an exhaust turbocharger, said double-flow turbine comprising a turbine wheel mounted on a rotatable shaft in a turbine housing and equipped with rotor blades, wherein each of the two overall exhaust lines is connected to one of two flows of the double-flow turbine, wherein the two flows are separated from one another, towards the turbine wheel in a direction of exhaust gas flow discharging from the exhaust gas discharge systems of the cylinder groups, by a housing wall, wherein each rotor blade of the turbine wheel has an inlet edge facing the flows, the inlet edge including a first inlet edge and a second inlet edge, wherein the first inlet edge associated with a first flow and the second inlet edge associated with a second flow are connected to one another at a connection point, which has an inflection, and wherein the first inlet edge has a concave side, which forms part of a rear side of the rotor blade as the shaft revolves.

2. The pressure-charged combustion engine as claimed in claim 1, wherein the connection point lies opposite the housing wall.

3. The pressure-charged combustion engine as claimed in claim 1, wherein the inflection is sharp.

4. The pressure-charged combustion engine as claimed in claim 1, wherein the inflection is rounded and/or points outward.

5. The pressure-charged combustion engine as claimed in claim 1, wherein the first inlet edge has a convex side, which forms part of a front side of the rotor blade as the shaft revolves.

6. The pressure-charged combustion engine as claimed in claim 1, wherein the second inlet edge has a concave side, which forms part of a rear side of the rotor blade as the shaft revolves, and wherein the second inlet edge has a convex side, which forms part of a front side of the rotor blade as the shaft revolves.

7. The pressure-charged combustion engine as claimed in claim 1, wherein the housing wall is an immovable wall connected firmly to the housing.

8. The pressure-charged combustion engine as claimed in claim 1, wherein the housing wall separating the two flows from one another has a free, tongue-type end on a turbine wheel side and ends at a distance from the turbine wheel, thereby forming a tongue clearance, and wherein the tongue clearance is variable.

9. The pressure-charged combustion engine as claimed in claim 1, wherein the two flows of the double-flow turbine are selectively connectable to one another within the turbine housing by opening at least one opening upstream of the turbine wheel.

10. The pressure-charged combustion engine as claimed in claim 1, wherein the double-flow turbine is a twin-flow turbine.

11. A boosted engine system, comprising:
a cylinder head with an integrated manifold therein forming exactly two overall exhaust lines; and
a double-flow turbine with each overall exhaust line connected to only one of two flows of a turbine rotor blade that are separated from one another, a first inlet blade edge of a first flow and a second inlet blade edge of a second flow connected at a connection point to form an inflection;
wherein said double-flow turbine includes a turbine wheel mounted on a rotatable shaft in a turbine housing and equipped with rotor blades; and
wherein the second inlet blade edge has a concave side, which forms part of a rear side of the rotor blade as the shaft revolves, and wherein the second inlet blade edge has a convex side, which forms part of a front side of the rotor blade as the shaft revolves.

12. The boosted engine system of claim 11, wherein an engine is fueled by direct fuel injection.

13. The boosted engine system of claim 12, wherein the inflection occurs at the connection point.

* * * * *